US012246950B2

(12) United States Patent
Hay et al.

(10) Patent No.: US 12,246,950 B2
(45) Date of Patent: Mar. 11, 2025

(54) PIPE SPREADER

(71) Applicant: RAM LIFTING TECHNOLOGIES PTE. LTD., Singapore (SG)

(72) Inventors: Cameron Hay, Singapore (SG); Krishna Murari, Singapore (SG)

(73) Assignee: RAM LIFTING TECHNOLOGIES PTE. LTD., Singapore (SG)

( * ) Notice: Subject to any disclaimer, the term of this patent is extended or adjusted under 35 U.S.C. 154(b) by 802 days.

(21) Appl. No.: 17/054,095

(22) PCT Filed: May 3, 2019

(86) PCT No.: PCT/SG2019/050250

§ 371 (c)(1),
(2) Date: Nov. 9, 2020

(87) PCT Pub. No.: WO2019/216823

PCT Pub. Date: Nov. 14, 2019

(65) Prior Publication Data

US 2021/0214191 A1 Jul. 15, 2021

(30) Foreign Application Priority Data

May 8, 2018 (SG) ........................... 10201803886Q

(51) Int. Cl.
*B66C 1/30* (2006.01)
*B66C 15/06* (2006.01)

(52) U.S. Cl.
CPC .............. *B66C 1/30* (2013.01); *B66C 15/065* (2013.01)

(58) Field of Classification Search
CPC .. B66C 1/28; B66C 1/30; B66C 1/425; B66C 1/427; B66C 1/445; B66C 1/447; B66C 1/62; B66C 15/065
USPC .................................. 294/81.2, 81.54, 81.62
See application file for complete search history.

(56) References Cited

U.S. PATENT DOCUMENTS 4,029,217 A * 6/1977 Morse ........................ B66F 9/18 414/746.5
4,563,031 A * 1/1986 Kishimoto ................ B66C 1/62 294/907
5,997,064 A * 12/1999 Orita ........................ B66C 1/445 294/81.62
(Continued)

FOREIGN PATENT DOCUMENTS

AU 2010202113 12/2010
CN 202729575 2/2013
(Continued)

OTHER PUBLICATIONS

International Search Report and Written Opinion dated Jul. 15, 2019, PCT Patent Application No. PCT/SG2019/050250, filed May 3, 2019, Australian Patent Office, 10 pages.

*Primary Examiner* — Dean J Kramer
(74) *Attorney, Agent, or Firm* — Mannava & Kang, P.C.

(57) ABSTRACT

A pipe spreader comprising: a frame, and; a pair of mutually cooperating pipe engagement assemblies, coupled to the frame, for engaging a pipe; each of the pair of mutually cooperating pipe engagement assemblies comprises: at least one spreader assembly, the spreader assembly includes a spreader beam and an end manipulator coupled to the spreader beam, wherein at least a portion of the spreader assembly is arranged to be selectively removable from the pipe engagement assembly.

8 Claims, 9 Drawing Sheets

(56) References Cited

U.S. PATENT DOCUMENTS

| | | | | |
|---|---|---|---|---|
| 7,261,351 | B1 * | 8/2007 | Lee | B66C 13/46 294/81.1 |
| 2019/0010027 | A1 | 1/2019 | Taylor | |

FOREIGN PATENT DOCUMENTS

| | | | | | |
|---|---|---|---|---|---|
| CN | 204529104 | U | | 8/2015 | |
| CN | 105384060 | | | 3/2016 | |
| CN | 107954313 | A | * | 4/2018 | B66C 1/28 |
| DE | 2336903 | A | * | 2/1975 | B66C 1/30 |
| EP | 0141518 | | | 5/1985 | |
| FR | 2108994 | | | 5/1972 | |
| FR | 2767519 | A1 | * | 2/1999 | B66C 1/62 |
| JP | S59203089 | A | | 11/1984 | |
| JP | S6371092 | A | | 3/1988 | |
| JP | 2006096557 | A | | 4/2006 | |
| JP | 2006273475 | A | | 10/2006 | |
| SU | 1425165 | | | 9/1988 | |
| WO | 2017152235 | | | 9/2017 | |

* cited by examiner

PIPE SPREADER

PRIORITY

The present application is a national stage filing under 35 U.S.C 371 of PCT application number PCT/SG2019/050250, having an international filing date of May 3, 2019, which claims priority to Singaporean patent application number 10201803886Q, having a filing date of May 8, 2018, the disclosures of which are hereby incorporated by reference in their entireties.

FIELD OF THE INVENTION

The invention relates to a spreader adapted to engage and transport pipes.

BACKGROUND

Transportation of large pipes is frequently required for example in the shipping and construction industries. Typically, these pipes are clamped onto spreaders and lifted by cranes to the required location.

Existing pipe spreaders are designed to hoist a fixed number of pipes, within a limited range of pipe diameters. Hence, during normal operation of a construction site or wharf, several spreaders may be required to hoist pipes with a full range of pipe diameters. These additional spreaders will require a considerable storage space to store, and will also incur additional maintenance expense and capital expenditure.

In addition, the clamping of pipes on existing pipe spreaders is usually done manually. As a result, it is not uncommon for there to be human error during the manual clamping of pipes, which may result in accidents and possibly put operators at risk of suffering a major injury.

SUMMARY OF THE INVENTION

In a first aspect of the present invention, there is provided a pipe spreader comprising: a frame; and a pair of mutually cooperating pipe engagement assemblies coupled to the frame for engaging a pipe; each of the pair of mutually cooperating pipe engagement assemblies comprises: at least one spreader assembly, the spreader assembly includes a spreader beam and an end manipulator coupled to the spreader beam, wherein at least a portion of the spreader assembly is arranged to be selectively removable from the pipe engagement assembly. In embodiments of the present invention, the end manipulator and/or the spreader beam is selectively removable from the pipe engagement assembly.

Accordingly, such an arrangement allows the selective removal and/or addition of a portion of the spreader assemblies so as to suit a wide range of pipe diameters and pipe lengths. This enhances the flexibility of the pipe spreader to handle a wide range of pipe diameters and pipe lengths.

The pair of mutually cooperating pipe engagement assemblies may also be combined to form a unitary body.

In embodiments of the present invention, the pipe spreader is arranged to slide in an orthogonal direction relative to a longitudinal axis of a pipe engagable by said pipe spreader.

Accordingly, such an arrangement allows the pipe spreader to adjust its position relative to the frame so as to clamp pipes of different sizes.

In embodiments of the present invention, the pipe engagement assembly may further comprise a support arm arranged to contact and support a pipe engagable by the pipe spreader as the pipe is lifted. The support arm may further be arranged to exert a downward force on the pipe. Alternatively, the support arm is spring loaded so as to exert a resilient downward force on the pipe.

Accordingly, the support arm will secure the pipe and prevent it from wobbling during the lifting process. Hence, this ensures stability of the pipe and enhances safety of the lifting operation.

In embodiments of the present invention, the end manipulator may further comprise a pipe engagement pin arranged to lift a pipe engagable by the pipe spreader. In embodiments of the present invention, the pipe engagement pin may be selectively engaged to the end manipulator. In further embodiments of the present invention, the end manipulator may further comprise a sheath selectively engaged to the pipe engagement pin.

Accordingly, such an arrangement ensures that the diameter of the pipe engagement pin may be adjusted based on the diameters of pipes to be lifted. In particular, the above arrangements ensures that the resultant diameter of the pipe engagement pin and/or the pipe engagement pin and sheave assembly matches the diameter of the pipes, thereby ensuring that the pipes are well supported during lifting.

In embodiments of the present invention, the pipe spreader may further comprise a height detection system, the height detection system is arranged to detect a height of the pipe relative to the frame and trigger an alarm when the height exceeds a predetermined threshold.

Accordingly, such an arrangement serves as an early warning system in the event that the pipe disengages from the pipe engagement assembly and falls to the ground.

BRIEF DESCRIPTION OF DRAWINGS

It will be convenient to further describe the present invention with respect to the accompanying drawings that illustrate possible arrangements of the invention. Other arrangements of the invention are also possible and consequently, the particularity of the accompanying drawings is not to be understood as superseding the generality of the preceding description of the invention.

DETAILED DESCRIPTION

Figure 1A:
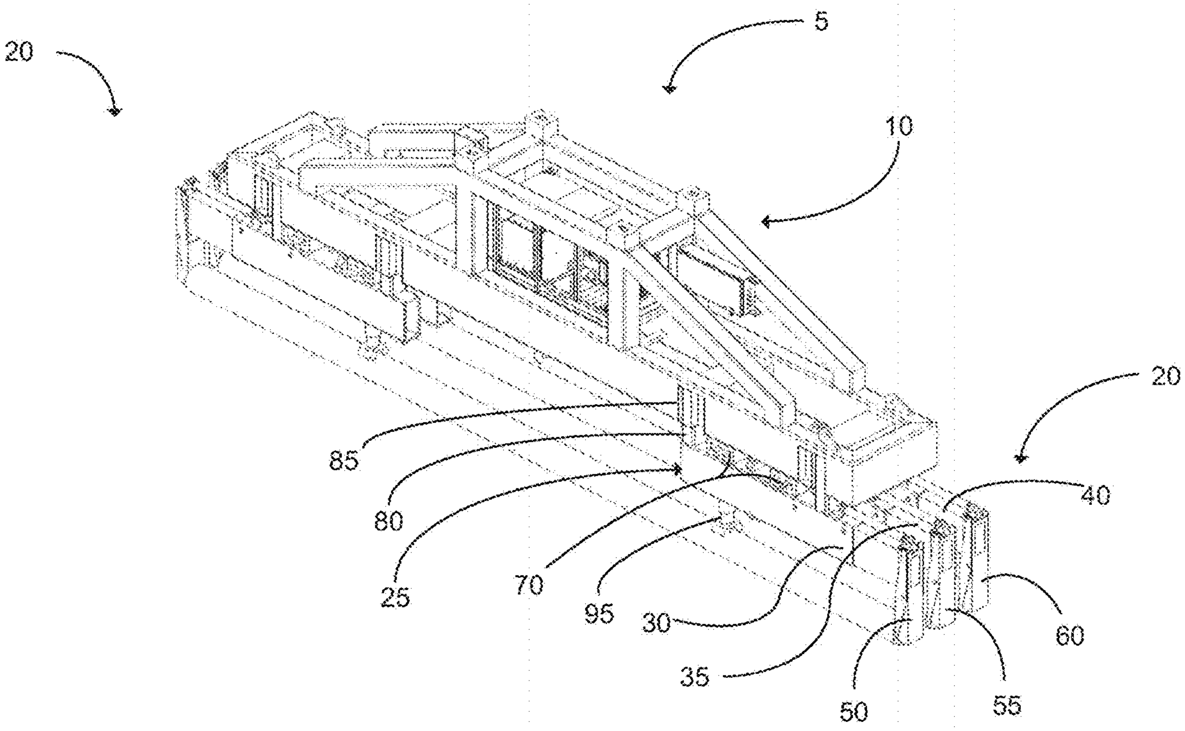
FIG. 1A is a perspective view of a pipe spreader according to one embodiment of the present invention.
Figure 1B:
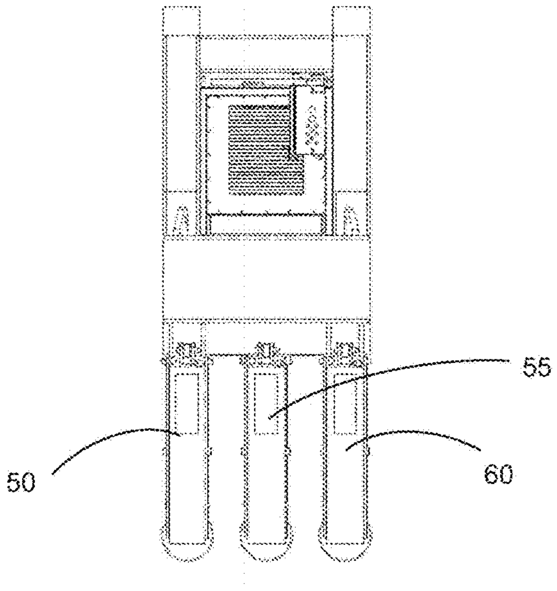
FIG. 1B is a side view of a pipe spreader according to one embodiment of the present invention.

FIGS. 1A and 1B show a pipe spreader 5 according to one embodiment of the present invention. In this embodiment, the pipe spreader 5 comprises a frame 10 and a pair of mutually cooperating pipe engagement assemblies 20 slidably engaged to the frame 10. Each pipe engagement assembly 20 further comprises at least one spreader assembly, wherein the spreader assembly 25 comprises a spreader beam 30 and an end manipulator 50. The spreader beam 30 may be a telescopic beam, or any other beams that allow the end manipulator to translate in the longitudinal direction of the spreader beam 30. Additionally, the spreader assembly 25 has a removable portion arranged to be selectively removable from the pipe engagement assembly. In an embodiment, the removable portion may be the end manipulator. In other embodiments, the removable portion may be the entire spreader assembly.

In this illustrated embodiment as shown in FIG. 1A, the pipe engagement assembly comprises three spreader assemblies. In particular, the pipe engagement assembly comprises two end spreader beams 30, 40 and a center spreader beam 35, and three end manipulators 50, 55, 60, wherein each end manipulator is coupled to one spreader beam. The center spreader beam 35 is slidably mounted to a C-channel 70 so as to allow movement of the center spreader beam 35 in an orthogonal direction relative to the longitudinal axis of the pipe. Furthermore, the two end spreader beams 30, 40 comprises at least one arm 80 positioned in channels 85 formed on the body of the frame 10. Actuators are provided on the frame between the 2 C-channels 70 so as to engage the arms 80 and allow the two end spreader beams 30, 40, and consequently the corresponding spreader assemblies, to individually translate along the channels 85. The actuators may be hydraulic actuators, linear actuators or any other actuators that allow automatic movement of the spreader beams. To this end, the actuators allow the two end spreader beams 30, 40 to translate automatically without the need for manual intervention. In particular, the actuators may be controlled using a handheld wireless controller. The operator will then use the controller to control the movement of the spreader beams so as to adjust the position of the end manipulators in accordance with the pipe diameters. In embodiments of the present invention, a linear encoder is provided. The linear encoder functions to allow the actuators to position the arms correctly so as to cater for the different diameter of the pipes to be lifted.

Figure 2:
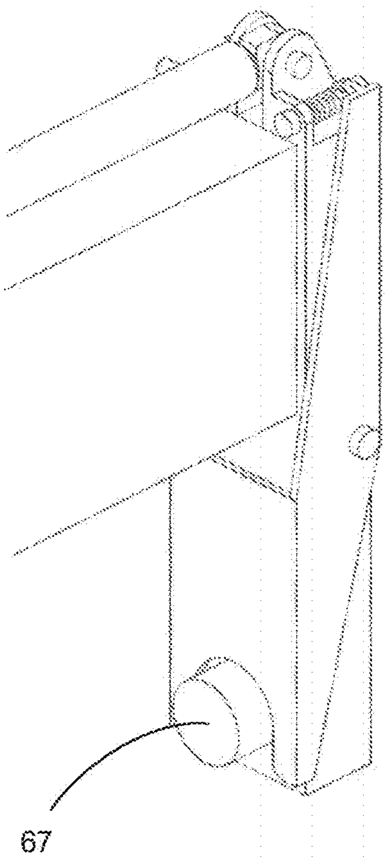
FIG. 2 is a drawing of an end manipulator of the pipe spreader according to one embodiment of the present invention.

FIG. 2 shows one embodiment of the end manipulator in further detail. As shown, the end manipulator further comprises pipe engagement pin (67) arranged to engage the pipe so as to allow lifting.

The basic operation of the pipe spreader will be described in further detail. In particular, the pipes to be lifted are arranged on the ground or the ship deck. The pipe spreader is set first to handle the correct diameter of the pipe by manipulating the arms to the correct orthogonal position. Following which, the pipe spreader 5 is lowered so that the pipe engagement pins (67) of the end manipulators correspond with the openings of the pipe. The telescopic portions of the spreader beams 30, 35, 40 will then retract, causing the end manipulators 50, 55, 60 to engage the pipes. Finally, the pipe spreader will be lifted and the pipe engagement pins (67) will engage the pipes, thereby commencing the lifting operation.

To this end, the pipe spreader 5 of the present invention allows for selective removal and/or addition of spreader assemblies and/or end manipulators so as to suit a wide range of pipe diameters and pipe lengths. In particular, the removable portion of the spreader assembly is arranged to be selectively removable from the pipe engagement assembly. For example, three spreader beams as described above and illustrated in FIGS. 1A and 1B can be used to handle three pipes per lift for medium sized pipes.

Figure 3:
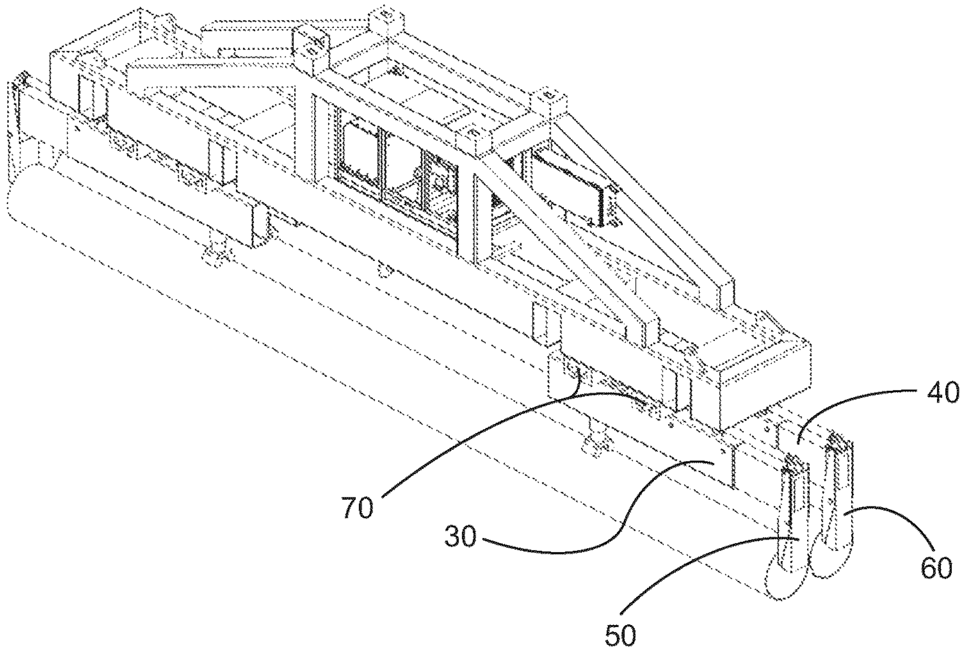
FIG. 3 is a perspective view of a pipe spreader according to one embodiment of the present invention.
Figure 4:
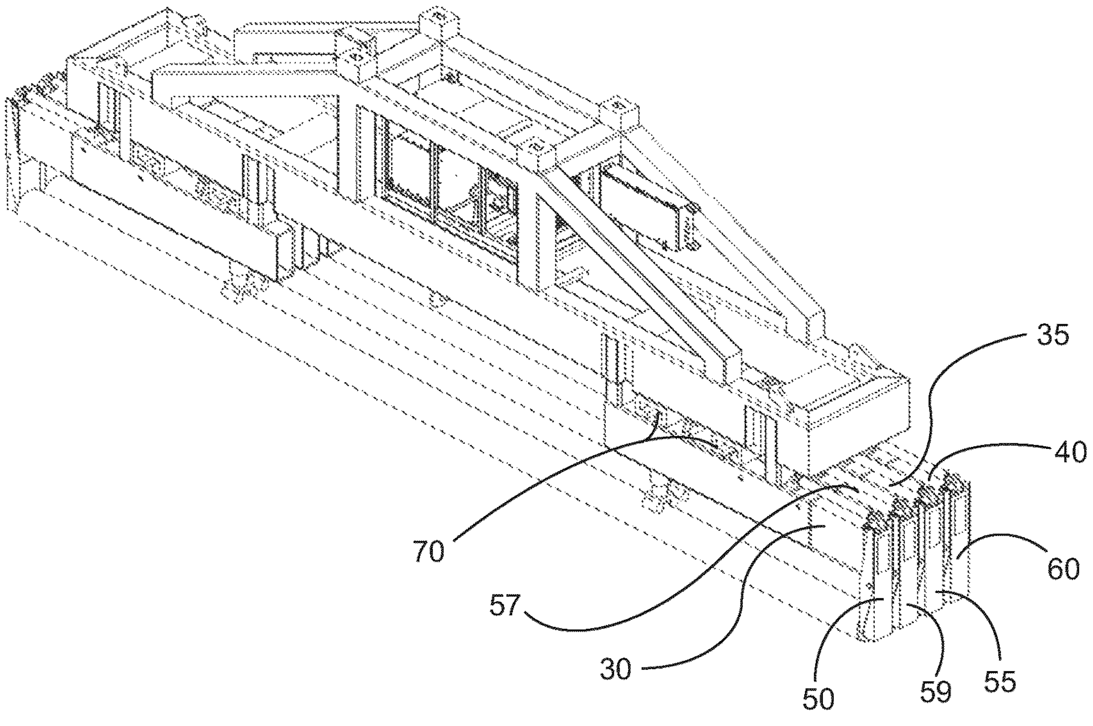
FIG. 4 is a perspective view of a pipe spreader according to one embodiment of the present invention.

However, when larger diameter pipes are lifted, the pipe spreader 5 can only handle two pipes per lift. In this case, the center spreader beam 35 and its corresponding end manipulator 55 may be removed (as shown in FIG. 3) from the pipe engagement assembly 20 so as to allow the spreader to handle only 2 pipes per lift. Similarly, as shown in FIG. 4, if smaller diameter pipes are lifted such that the pipe spreader 5 can handle four pipes per lift, an additional center spreader beam 57 and its corresponding end manipulator 59 may be added to the pipe engagement assembly 20. Like the center spreader beam 35, the additional center spreader beam 57 may also be mounted onto the C-channel 70 as to allow movement along its transverse axis. In this regard, the centre spreader beam 35 and the additional center spreader beam 57 may be manually or automatically manipulated along their transverse axes to suit the different diameters of the small diameter pipes.

Accordingly, the present invention enhances the flexibility of the pipe spreader to handle a wide range of pipe diameters and pipe lengths.

Figure 5A:
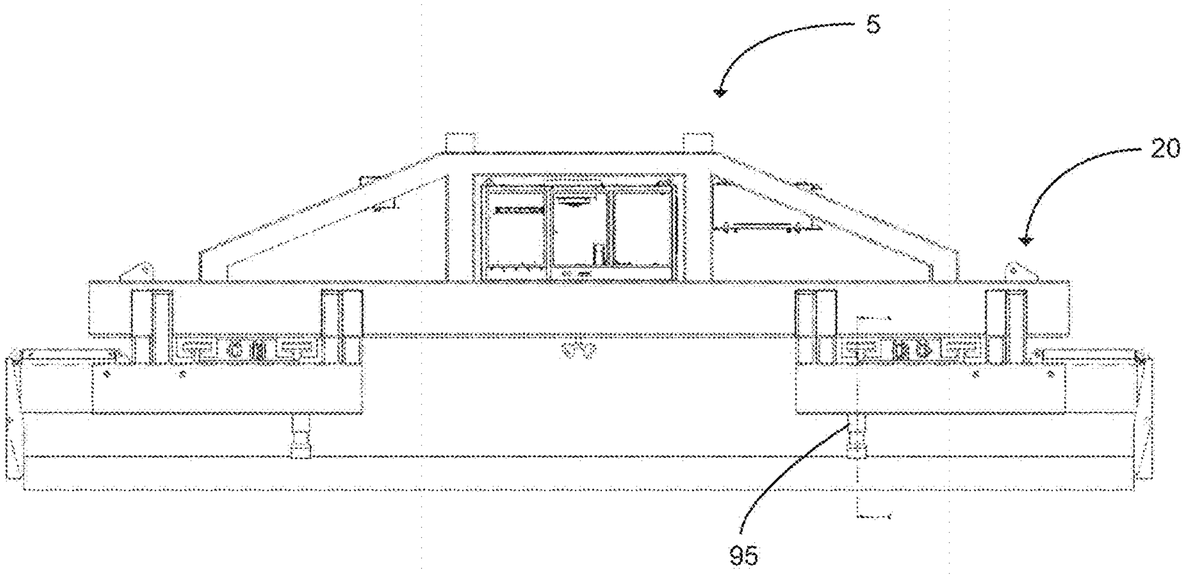
FIG. 5A is a side view of a pipe spreader according to one embodiment of the present invention.
Figure 5B:
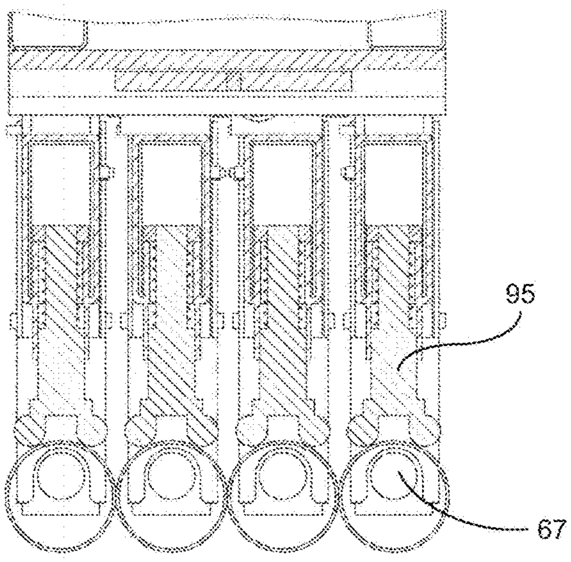
FIG. 5B is a cross-sectional view of a support arm of the pipe spreader as shown in FIG. 5A.

In embodiments of the present invention as shown in FIGS. 1A, 5A and 5B, the pipe engagement assembly 20 further comprises a support arm 95 positioned on the underside of at least one of the spreader beams 30, 35, 40, the support arm 95 is arranged to contact and support the pipe as the pipe is lifted. In this illustrated embodiment, the support arm 95 is spring loaded so as to exert a downward force on the pipe during the lifting operation.

In operation, when the pipe spreader 5 is lowered to align the pipe engagement pin (67) with the openings of the pipe, the support arm 95 will contact the pipe, causing the spring in the support arm 95 to compress and exert a downward force on the pipe. This will also activate a landing signal to inform the operator that the pipe spreader is in position so as to commence engagement of the pipes by the pipe engagement assemblies. Once the pipe engagement assemblies engage the pipes, the pipe spreader 5 will be hoisted and the pipe will be lifted. Due to the compression of the spring, the support arm 95 will still be in contact with the pipe during the entire lifting process, thereby supporting the pipe and preventing the pipe from wobbling (as shown in FIGS. 5A and 5B). Accordingly, such a feature ensures stability of the pipe and enhances safety of the lifting operation.

Figure 6A:
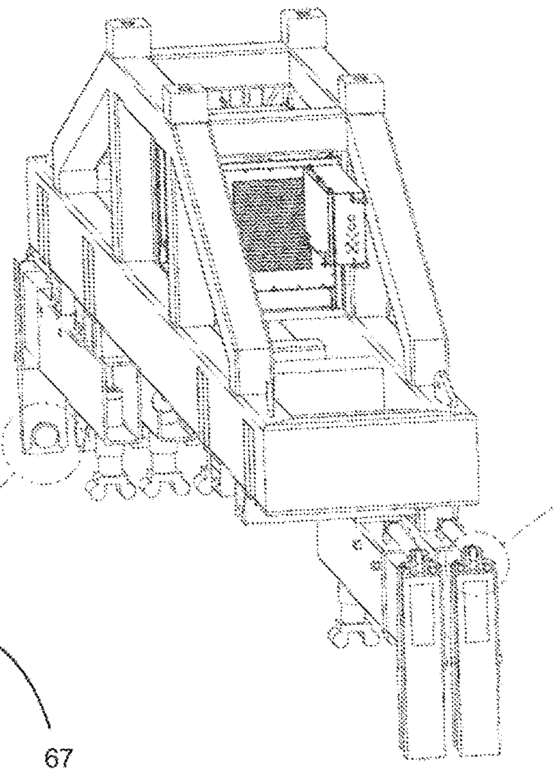
FIGS. 6A to 6C show a sensing assembly of the pipe spreader according to one embodiment of the present invention.
Figure 6B:
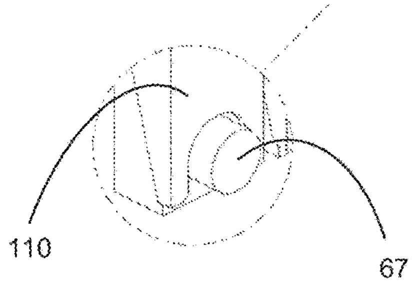

In embodiments of the present invention as shown in FIGS. 6A and 6B, the end manipulator may further comprise a first sensing assembly 110. The first sensing assembly 110 serves to determine if the end manipulators have sufficiently clamped onto the pipe, and provide a feedback signal to a LED device. The first sensing assembly 110 may be any mechanical mechanism and/or electronic sensor such as a pressure sensor, and may be positioned at the point of contact between the pipe and the end manipulator. In operation, when the pipe is being clamped, pressure will be applied onto the first sensing assembly causing the sensing assembly 110 to move from an unlock position to a lock position. Once the pressure reaches a predetermined threshold, the first sensing assembly 110 will send a signal to the spreader control system, lighting the LED device and signaling to the operators that the pipe is properly clamped and can be hoisted. Accordingly, such a system further enhances the safety of the pipe spreader.

Figure 6C:
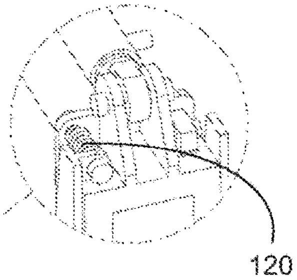

In embodiments of the present invention as shown in FIGS. 6A and 6C, the end manipulator may also comprise a second sensing assembly 120 positioned between the end manipulator and the spreader beam. The second sensing assembly 120 may be any mechanical mechanism and/or electronic sensor such as a pressure sensor. In operation, by using the mechanical link mechanism the second sensing assembly 120 can detect if the end manipulator has clamped the pipe sufficiently. Accordingly, such a system further enhances the safety of the pipe spreader.

Figure 7A:
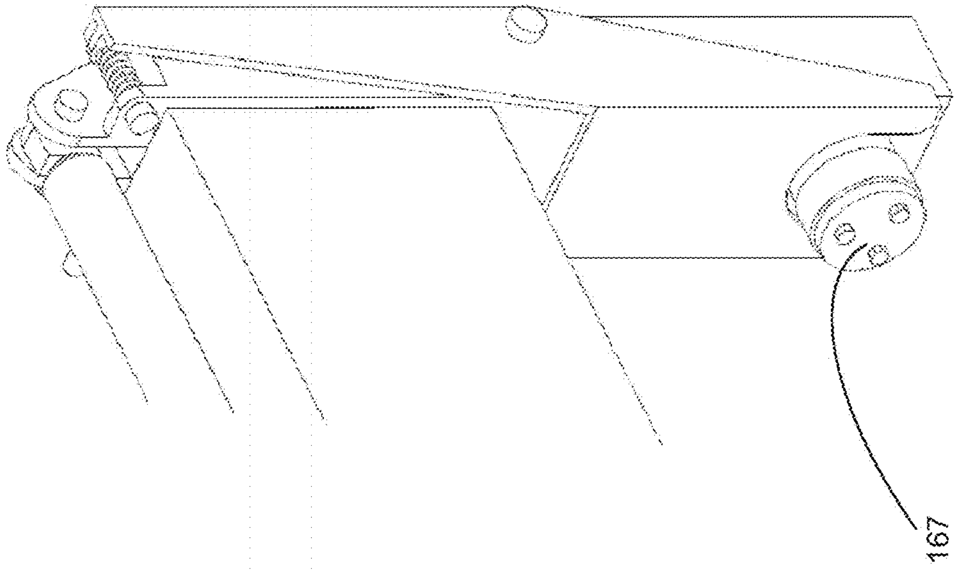
FIGS. 7A and 7B are drawings of an end manipulator of the pipe spreader according to one embodiment of the present invention.
Figure 7B:
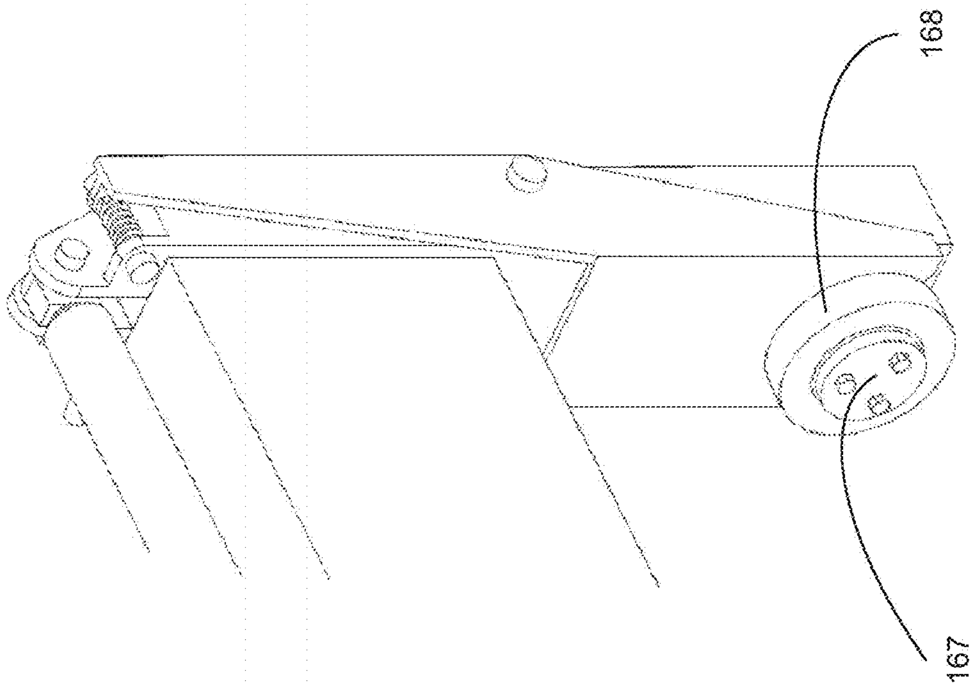

In further embodiments of the present invention as shown in FIGS. 7A and 7B, the size of the pipe engagement pin 167 may be customized to match the different pipe diameters. For example, as shown in FIG. 7B, the pipe engagement pin 167 may be fitted with a sheave 168 to enlarge the diameter of the pin. Accordingly, this ensures that the resultant diameter of the pipe engagement pin 167 and sheave 168 assembly matches the diameter of the pipes, thereby ensuring that the pipes are well supported during lifting. In other embodiments, the entire pipe engagement pin may be removeable, thereby ensuring easy switching of the pipe engagement pin so as to suit the diameter of the pipes to be lifted.

Figure 8:
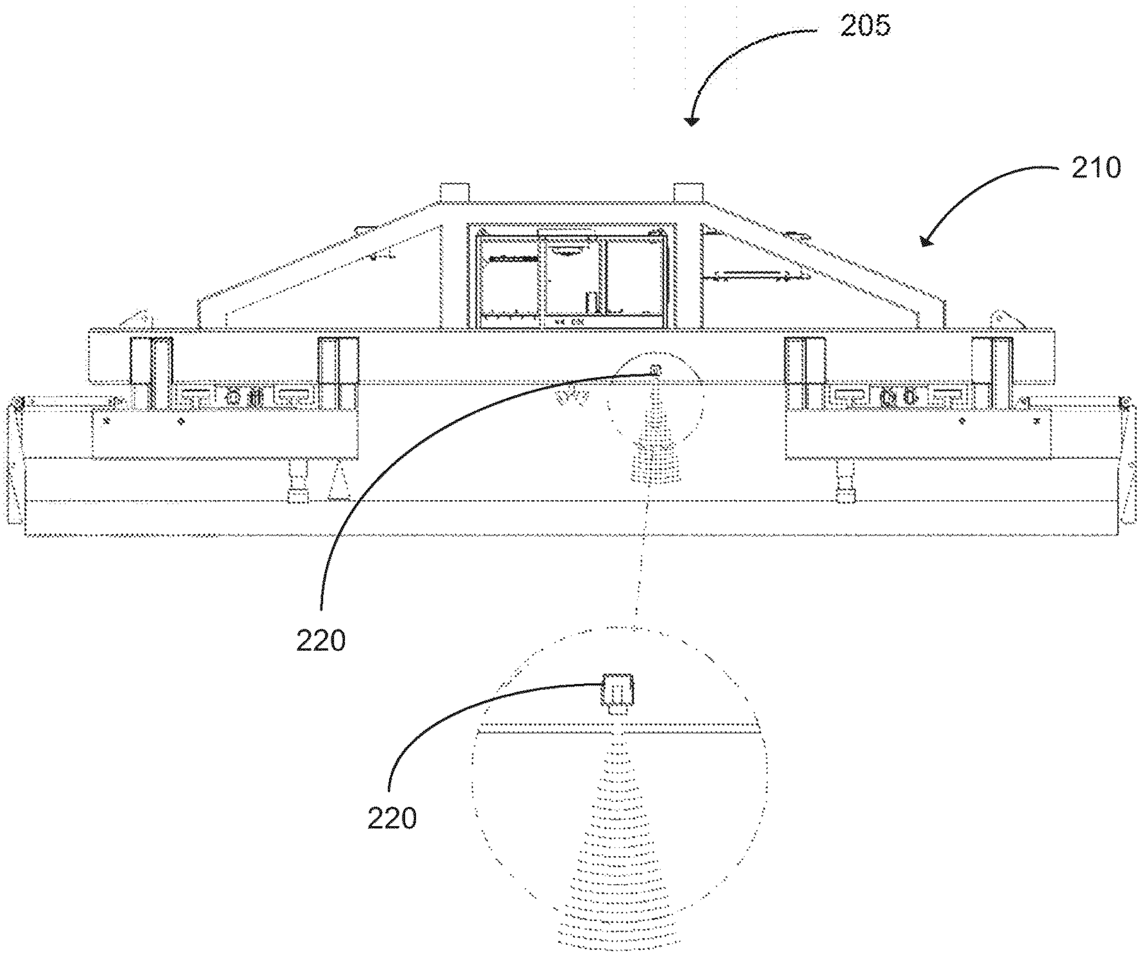
FIG. 8 is a front view of a pipe spreader with a height sensor according to one embodiment of the present invention.

In further embodiments of the present invention as shown in FIG. 8, the pipe spreader may further comprise a height sensor 220 positioned at the centre body section of the frame 210 of the pipe spreader 205. The height sensor 220 may be an ultrasonic sensor, or any other form of sensors that can detect the distance between two objects. Accordingly, when an operator lowers the spreader to pick up a pipe, the height sensor will trigger an alarm signal to the operator once the spreader reaches a predetermined height, thereby reminding the operator to decrease the lowering speed. Hence, this avoids any accidental high-speed impact of the spreader onto the pipes, therefore increasing the safety of the pipe spreader.

Figure 9:
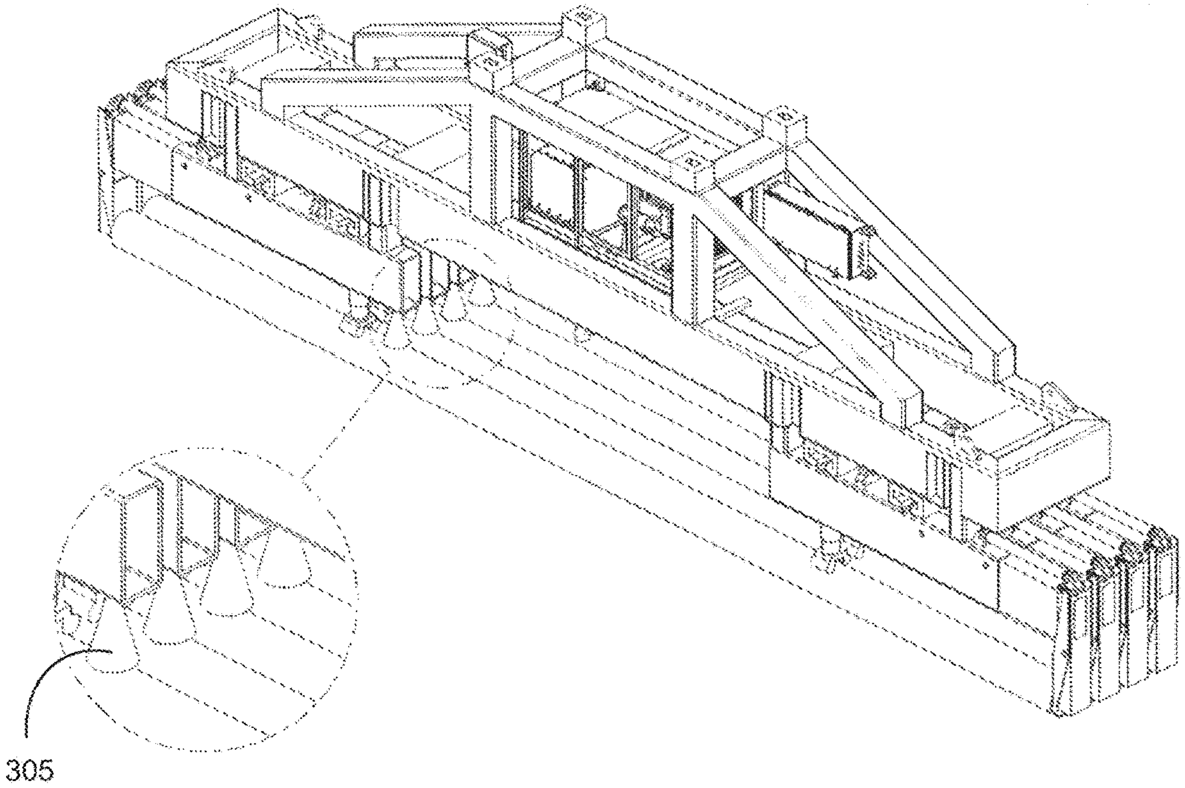
FIG. 9 is a detailed view of a pipe spreader with a detection system according to one embodiment of the present invention.

Referring now to FIG. 9, the pipe spreader may further comprise a detection system arranged to detect presence of the pipes when the pipe is being hoisted. For example, the detection system comprises at least one sensor 305 arranged to monitor the distance between the pipe and the sensor. This sensor may be a photoelectric sensor, ultrasonic sensor, or any other form of sensors that can detect the distance between two objects. The sensing distance is preset to a predetermined distance depending on the hoisting speed of the pipe spreader. Hence, if the distance between the pipe and the sensor is greater than the sensing distance, the sensor signal will be lost, and this will trigger an alarm to the operator to inhibit hoisting. In further embodiments of the present invention, a bypass function may also be provided so as to bypass any false alarm. Accordingly, such an arrangement serves as an early warning system in the event that the pipe disengages from the pipe engagement assembly and falls to the ground.

Figure 10:
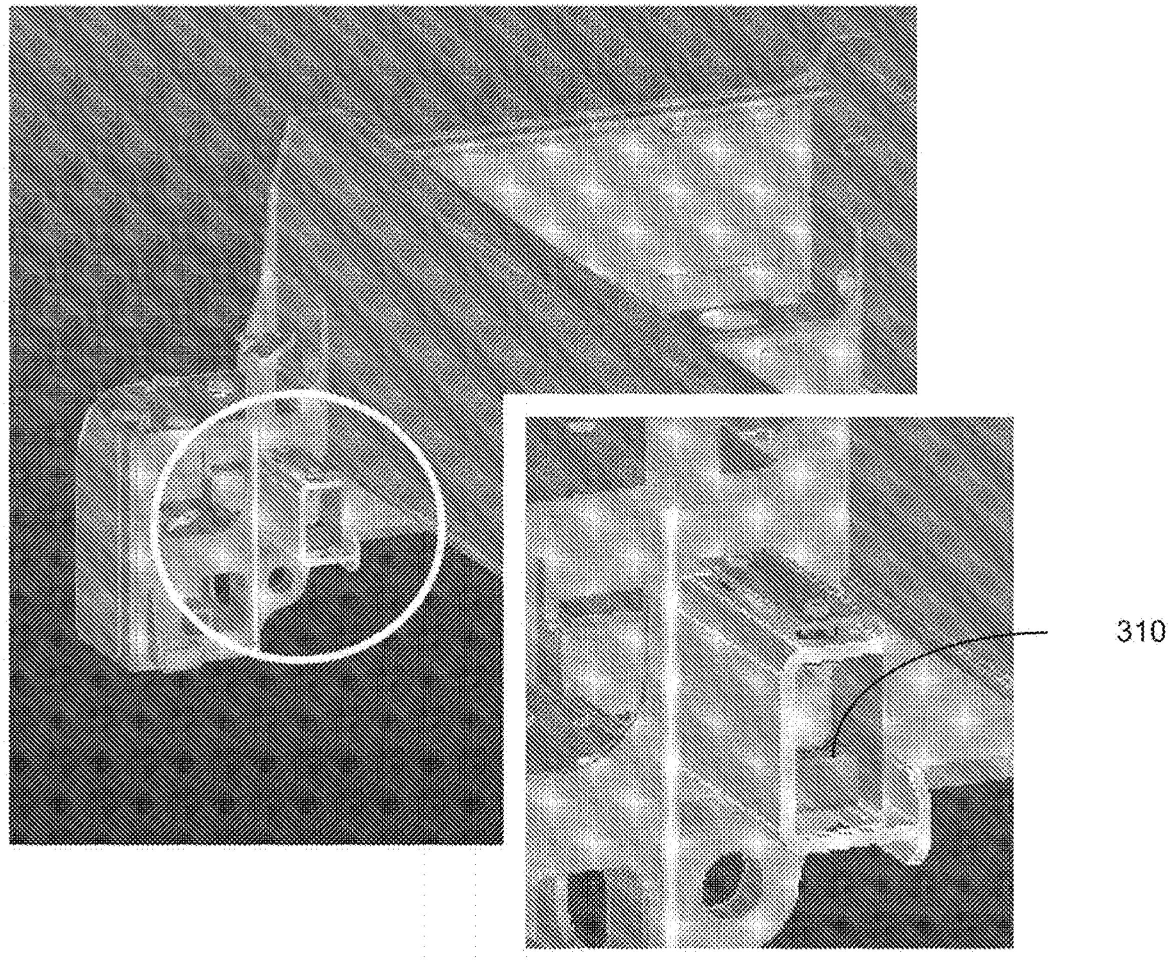
FIG. 10 is a detailed view of a pipe spreader with an imaging system according to one embodiment of the present invention.

In further embodiments of the present invention, the pipe spreader may further comprise an imaging system as shown in FIG. 10. Specifically, a camera 310 may be fitted near the end manipulators of the spreader, and the video feed may be transmitted live to a diagnostic system or a mobile device. Accordingly, the camera system extends the operator's view so as to allow him to better estimate the spreader-to-pipe alignment. Furthermore, damaged pipes can also be clearly identified to prevent incorrect engagement between the end manipulators and the pipe. Accordingly, the imaging system can assist the operator to land the spreader onto the pipe in the shortest possible time, while also increasing the safety of the equipment.

In embodiments of the present invention, the pipe spreader may communicate with a diagnostic system, and transmit diagnostic information received from the pipe spreader to the diagnostic system for display and analysis. Diagnostic information may include, but are not limited to, data from the above-mentioned sensors, environmental data or other data that might be required for analysis purposes. In an embodiment, a diagnostic panel may also be provided on the pipe spreader for monitoring sensor statuses and fault information, and also for assisting maintenance personnel in troubleshooting of the fault. These data may also be logged into a database for data and trend analysis. Accordingly, the diagnostic system provides for fast recovery and problem identification in the event of a breakdown. Furthermore, the logged data is also extremely useful for incident root cause analysis and pre-breakdown warning.

Whilst the above embodiments depict a pair of mutually cooperating pipe engagement assemblies working in tandem to engage a pipe, a skilled person will understand that the two pipe engagement assemblies can be combined to form one unitary assembly. A skilled person will also understand that instead of the two pipe engagement assemblies, two mutually cooperating spreader assemblies or two mutually cooperating spreader beams can also be combined to form one unitary assembly.

It would be appreciated that the invention has been described herein by way of example only and that various modifications in design and/or detail may be made without departing from the spirit and scope of this invention.

The invention claimed is:

1. A pipe spreader comprising:
- a frame; and
- a pair of mutually cooperating pipe engagement assemblies, coupled to the frame, for engaging a pipe;
- each of the mutually cooperating pipe engagement assemblies comprises:
  - at least one spreader assembly, the at least one spreader assembly includes a spreader beam and an end manipulator coupled to the spreader beam,
  - wherein the at least one spreader assembly is arranged to be selectively removable from the pipe engagement assembly;
  - said spreader beam having at least one arm positioned in at least one channel formed on the frame such that the spreader beam is arranged to slide along the at least one channel;
  - wherein the spreader beam and the spreader assembly are arranged to slide in an orthogonal direction relative to a longitudinal axis of a pipe engageable by said pipe spreader.

2. The pipe spreader according to claim 1, wherein each of the pipe engagement assemblies further comprises a support arm arranged to contact and support the pipe engageable by the pipe spreader as the pipe is lifted.

3. The pipe spreader according to claim 2, wherein the support arm is arranged to exert a downward force on the pipe.

4. The pipe spreader according to claim 2, wherein the support arm is spring loaded so as to exert a resilient downward force on the pipe.

5. The pipe spreader according to claim 1, wherein the end manipulator further comprises a pipe engagement pin selectively engaged to the end manipulator, the pipe engagement pin arranged to lift the pipe engageable by the pipe spreader.

6. The pipe spreader according to claim 5, further comprising a sheath selectively engaged to the pipe engagement pin.

7. The pipe spreader according to claim 1, wherein the pair of mutually cooperating pipe engagement assemblies is combined to form a unitary body.

8. The pipe spreader according to claim 1, further comprising a height detection system, the height detection system is arranged to detect a height of the pipe relative to the frame and trigger an alarm when the height exceeds a predetermined threshold.

* * * * *